UNITED STATES PATENT OFFICE.

WILLIAM J. CHRYSTAL, OF GLASGOW, COUNTY OF LANARK, SCOTLAND.

MANUFACTURE OF BICHROMATE OF SODA.

SPECIFICATION forming part of Letters Patent No. 342,578, dated May 25, 1886.

Application filed November 28, 1885. Serial No. 184,198. (Specimens.) Patented in England February 27, 1884, No. 4,028.

*To all whom it may concern:*

Be it known that I, WILLIAM JAMES CHRYSTAL, a citizen of the United Kingdom of Great Britain and Ireland, residing at Glasgow, in the county of Lanark, Scotland, have invented new and useful Improvements in the Manufacture of Bichromate of Soda; and I do hereby declare that the following is a full, clear, and exact description of the invention, which will enable others skilled in the manufacture or art to which it relates to make and use the same.

My invention consists of improvements in the process of manufacturing bichromate of soda, whereby I insure the production of bichromate of soda in a state of purity.

In carrying out my invention I furnace chrome ore with lime and a soda salt or salts in the usual way until decomposition is effected. I then lixiviate the furnaced mass, but, in lieu of employing water alone in the ordinary way, I use an acidified solution of a soda salt for the lixiviating operation, in order that while dissolving out the chromate of soda I may also decompose such insoluble chromates as are present in the mass, and I wash the mass with water; or, in lieu of using an acidified solution of a soda salt, I may use separately an acid and a solution of a soda salt, or I may use dilute acid alone in cases where an excess of soda has been used in the furnacing operation. The liquor obtained by lixiviation and washing of the furnaced mass is a solution of monochromate and bichromate of soda. To this solution I add sulphuric acid in order to convert the neutral chromate—*i. e.*, the monochromate—into the bichromate of soda and into sulphate of soda, and I evaporate the solution, the acid being added before or during evaporation or even after it. I then concentrate the solution; but instead of carrying the concentration to the stage at which a pasty mass is formed and in which the soda salts remain in admixture with the bichromate of soda, I carry it to a point varying from about one hundred and fifty to one hundred and eighty degrees Twaddle, at which the sulphate of soda is altogether eliminated and only pure bichromate of soda is left in solution. The solution when freed from the sulphate of soda is then placed in suitable vessels and crystallized, or it may be evaporated to dryness and calcined or fused or otherwise finished.

The crystals of pure bichromate of soda obtained as above mentioned contain about fourteen and one-half per centum of water of combination and are represented by the formula $2Na_2Cr_2O_7 + 5H_2O$. The solution may, however, after elimination of the sulphate of soda and before crystallization, be concentrated beyond the point named above, in which case the crystals may contain any smaller quantity of water than corresponds to the formula given.

Having now described the invention, what I desire to claim and secure by Letters Patent is—

1. The process of manufacturing pure bichromate of soda, which consists in furnacing chrome ore with lime and a soda salt in the usual way, then lixiviating the furnaced mass with an acidified solution of a soda salt and washing with water, then treating the solution obtained by lixiviation and washing with an acid to convert the neutral or monochromate into bichromate of soda, then concentrating the solution to a point varying from one hundred and fifty to one hundred and eighty degrees Twaddle to eliminate the sulphate of soda, separating the latter, and placing the solution in suitable vessels in order to obtain pure bichromate of soda in the crystalline form, substantially as set forth.

2. The process of manufacturing pure bichromate of soda, which consists in furnacing chrome ore with lime and a soda salt in the usual way, then lixiviating the furnaced mass with an acidified solution of a soda salt and washing with water, then treating the solution obtained by lixiviation and washing with an acid to convert the neutral or monochromate into bichromate of soda, then concentrating the solution to a point varying from one hundred and fifty to one hundred and eighty degrees Twaddle to eliminate the sulphate of soda, separating the latter, then continuing the concentration, and calcining or fusing or otherwise finishing the pure bichromate thus obtained, substantially as set forth.

3. In the process of manufacturing bichromate of soda, the method herein described of treating the decomposed mass from the furnace by lixiviating it with an acidified solution of a soda salt, as and for the purpose set forth.

4. The mode herein described of obtaining pure crystallized bichromate of soda from a solution of bichromate of soda containing foreign soda salts, said mode consisting in concentrating the solution to a point varying from one hundred and fifty to one hundred and eighty degrees Twaddle in order to eliminate such soda salts and crystallizing out the bichromate of soda from the purified solution, substantially as set forth.

In witness whereof I have hereunto set my hand this 13th day of November, 1885.

W. J. CHRYSTAL.

Witnesses:
  HUGH FITZPATRICK,
    135 *Buchanan St., Glasgow.*
  JAMES HISLOP,
    75 *West Nile Street, Glasgow.*